July 10, 1951  O. FISCHER  2,560,163
AIR RELAY DEVICE FOR PRESSURE CONTROLLED SYSTEMS
Filed Sept. 17, 1946
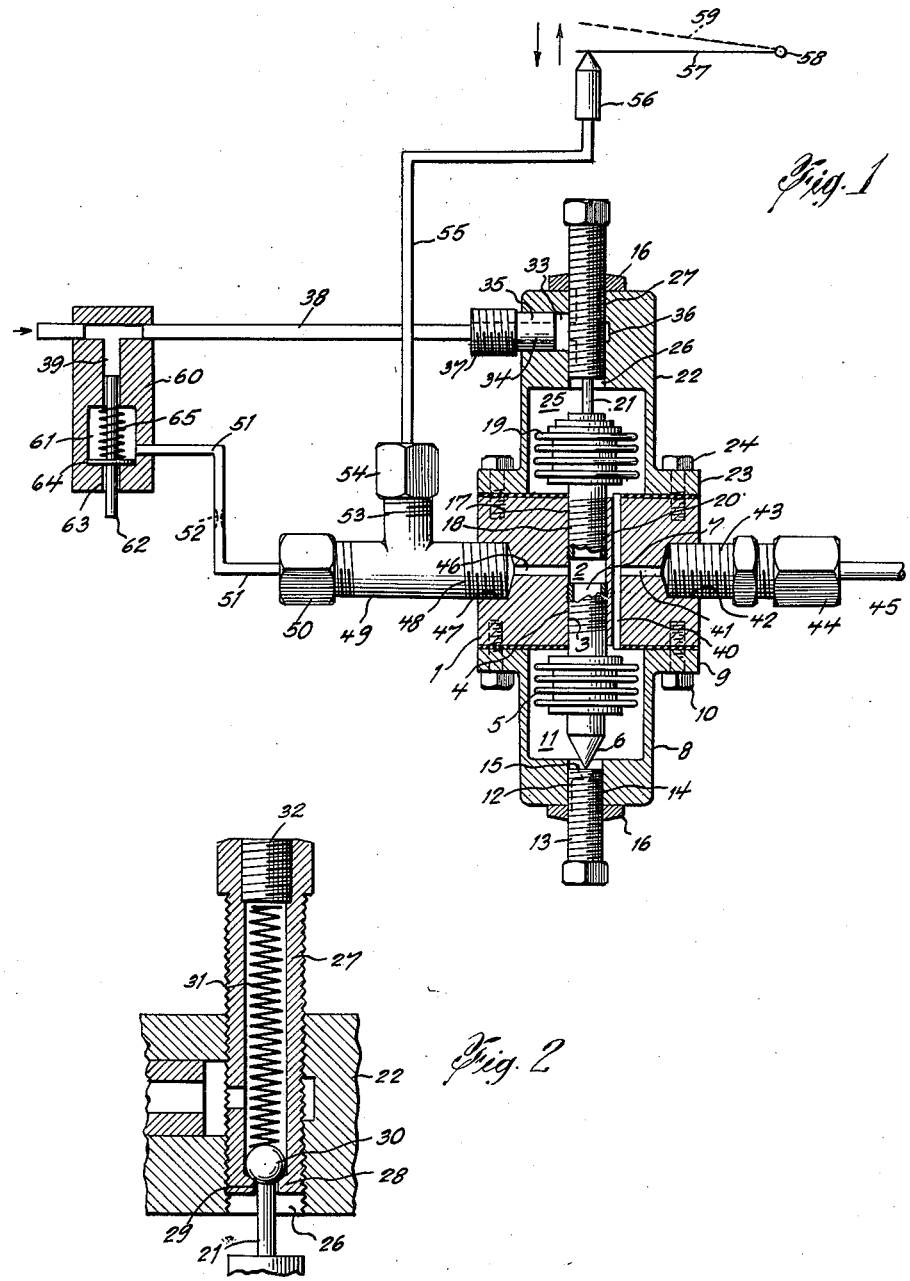
INVENTOR
OTTO FISCHER
BY  H.C. Bierman
ATTORNEY Patented July 10, 1951

2,560,163

UNITED STATES PATENT OFFICE 2,560,163

AIR RELAY DEVICE FOR PRESSURE CONTROLLED SYSTEMS

Otto Fischer, Corona, N. Y., assignor, by mesne assignments, to American Machine and Metals, Inc., New York, N. Y., a corporation of Delaware Application September 17, 1946, Serial No. 697,455

12 Claims. (Cl. 137—153)

The present invention is directed to a control mechanism, more particularly to pressure responsive regulators for controlling various functions such as temperature, pressure, or other conditions in an operating system.

Such a regulator has been described and claimed in my copending application Serial No. 623,015, filed October 18, 1945, entitled "Pressure Responsive Regulator." Said application is directed to a regulating device including a bellows arrangement, whereby a valve is opened and closed by the movements of the bellows responsive to changes in fluid pressure. Such pressure is exerted both on the inside and the outside of the bellows and the differential pressure causes movements whereby air or other fluid may be at desired intervals transmitted to a diaphragm or other means for operating a valve or the like. Such a device has been found quite effective in practice and excellent regulation of conditions in a system has been obtained thereby. However, it is often desirable to have a still greater degree of sensitiveness so that even minute variations in pressure may cause operation of the regulating device.

In said device, there is usually provided a bleeder opening so that when air is flowing to the diaphragm motor valve, there is a loss of air through the bleeder opening. This places an additional load on the compressor so that it sometimes operates more often than is desired.

The present invention is intended and adapted to improve upon the device of my aforesaid application for patent, it being among the objects of the present invention to provide a regulator in which there is present an increased sensitiveness and response to pressure changes.

It is also among the objects of the present invention to provide a regulator device operating on the fluid pressure source in which the volume of air or other fluid necessary for the operation is reduced to a minimum. It is still further among the objects of the present invention to provide a device which is simple in construction, which has very few moving parts, which is positive in its action and capable of operating satisfactorily under considerable variations of fluid pressure.

In practicing the present invention, there is provided a supply of fluid pressure such as air and a control mechanism which is adapted to be operated by said air pressure. Said control mechanism may be a usual type such as the ordinary diaphragm motor valve. Interposed between the source of pressure and the control mechanism is a relay or regulator which includes a pair of chambers formed in a suitable casing or block. In each of the chambers there is provided a bellows, which bellows is adapted to operate a valve. One of the valves when opened allows air under pressure to be transmitted to the control mechanism and the other valve when opened allows air pressure to be removed from the control mechanism. The two chambers are in communication with each other and with the control mechanism. There is also provided a duct connected to the air supply and having a constricted passageway so as to limit the amount of air passing through same, said duct being in communication with the inside of both bellows. The main supply tube which provides air pressure for the control mechanism is in communication with both chambers. The constricted duct also communicates with a nozzle arrangement controlled by a pivoted flapper valve so that as the flapper changes its position relative to the nozzle, variations of pressure are transmitted to the relay or regulator to suitably operate the diaphragm motor valve.

In the accompanying drawing constituting a part hereof and in which like reference characters indicate like parts, Fig. 1 is a vertical cross-sectional view taken through the relay or regulator and showing all of the operating parts thereof, and Fig. 2 is an enlarged fragmentary vertical cross-sectional view of a spring pressed valve constituting one of the elements of the regulator.

There is provided a casing or block 1 which may be rectangular in cross-section, having a relatively large opening 2 centrally thereof. The lower end 3 is threaded and a similarly threaded sleeve 4 is held therein. The sleeve is united with a bellows 5, the lower end 6 of which constitutes a valve. The sleeve 4 has an opening 7 therein communicating with the interior of bellows 5.

A hollow cap 8 has a flange 9 seated on the lower face of casing 1 and held thereon by screws 10. A suitable gasket may be interposed between flange 9 and casing 1 to provide a pressure-tight seal. The interior 11 of cap 8 constitutes a chamber and a central opening 12 is formed in the cap for the reception of a sleeve 13 which is threaded into opening 12. A passageway 14 is provided in member 13 and at the inner end 15 thereof there is formed a seat for valve 6. A lock nut 16 holds member 13 in adjusted position.

The upper end 17 of opening 2 is threaded and sleeve 18 is fitted into the same. It carries a bellows 19 and an opening 20 in sleeve 18 allows communication with the interior of bellows 19. A pin or extension 21 is attached to the upper or closed end of bellows 19.

A hollow cap 22 has a flange 23 contacting with the upper face of casing 1 and held in place by screws 24. A gasket may be interposed to form a pressure-tight seal. Both cap 8 and cap 22 are usually circular in horizontal cross-section.

Hollow portion 25 of cap 22 provides a chamber for bellows 19. The top of the cap has a threaded opening 26 into which a similarly threaded sleeve 27 is held. The lower end 28 is formed with a seat leaving an opening 29 for the entrance of pin 21. Ball 30 is placed in the lower end of sleeve 27, coil spring 31 is placed thereover, and a plug 32 is threaded into the sleeve to hold the ball and spring in proper position.

Into an opening 33 in the side of the upper portion of cap 22 is threaded a sleeve 34 having an opening 35 therein. A groove 36 allows communication between opening 35 and the interior of sleeve 27 under all positions of said sleeve. Cap 37 is threaded on the outside of sleeve 34 and it carries tube 38 with an air-tight seal. Formed in casing 1 is an opening 40 which communicates with chambers 11 and 25. A branch 41 from opening 40 communicates with enlarged threaded opening 42 on one side of casing 1. Hollow sleeve 43 is threaded into opening 42 and it carries cap 44, which holds pipe 45 in position with an air-tight seal.

On the opposite side of casing 1 is an opening 46 communicating with opening 2 and also with enlarged threaded opening 47. A hollow T member has one leg 48 threaded into opening 47. The opposite leg 49 is provided with a cap 50 which holds duct 51 in fixed position with an air-tight seal. A constriction 52 is formed in duct 5 to limit the flow of air therethrough. The third leg 53 of said T is provided with a cap 54 which holds pipe 55 in air-tight relation to the sleeve. It communicates with nozzle 56, the open end of which is in proximity to a flapper valve 57 pivoted at 58, said flapper being adapted to assume a number of positions between position 57 and dotted lines 59, under various conditions of operation of the device.

There is usually provided a clean-out device consisting of a body 60 having a hollow portion 61. Tube 38 passes through the same and a branch 39 communicates with opening 61. Duct 51 also communicates therewith. A stem 62 fits loosely into passageway 63 and has a valve 64 secured thereto. A spring 65 presses said valve downward to close opening 63. When it is desired to clean out the system to prevent blocking of duct 51, rod 62 is pressed upwardly, unseating valve 64 and allowing air to pass out through opening 63. Any dirt which may have accumulated in duct 51 is blown out due to the reduction of pressure in opening 61.

The operation of the device in order to obtain control of the diaphragm motor valve or the like, is as follows. When no air is flowing into the relay, ball valve 30 rests on seat 28, being held in position by spring 31. Sleeve 27 is adjusted in opening 26 to a point where the end of pin 21 just fails to touch ball 30. In a similar manner, sleeve 13 is adjusted so that valve 6 contacts seat 15 to just cut off flow of air therethrough. Lock nuts 16 are utilized to hold sleeves 13 and 27 in their adjusted positions.

Air or other fluid under a suitable pressure, usually 15 lbs. per sq. in., is caused to enter through tube 38. Assuming that the flapper valve is in its fully opened position as shown at 59, the operation is as follows: Air is unable to enter chamber 25 because of the seating of ball 30. However, a minute amount of air flows past constriction 52 in duct 51 through pipe 55 and out of the nozzle 56. At the same time air from duct 51 passes through opening 46 into the interior tube of casing 1 and therefrom into the interior of bellows 5 and 19. When flapper valve 59 moves slightly towards nozzle 56, it partially blocks the flow of air therefrom, creating back pressure in pipe 55, which is transmitted to bellows 5 and 19, causing both of said bellows to expand slightly. The expansion of bellows 5 causes valve 6 to seat more firmly and the expansion of bellows 19 causes pin 21 to raise up and unseat ball 30, thus causing air from tube 38 to enter chamber 25 and pass through passageway 40 and into chamber 11. Air also passes through pipe 45 to the diaphragm motor valve, causing operation thereof and a change in the conditions of the system being controlled.

When sufficient air has entered chamber 25 so that the pressure therein is greater than that in bellows 19, the latter is compressed, causing retraction of pin 21 and closing of valve 30. Since there is no bleeding off of the pressure, it will remain constant in the diaphragm valve as long as the flapper does not change its position. If the flapper moves a short distance downward again towards nozzle 56, blocking still more the flow of air from said nozzle, then the sequence of operations is repeated. The amount of air pressure thus admitted to chambers 11 and 25 and pipe 45 will be in direct proportion to the distance the flapper has moved towards the nozzle. In all such downward movement of the flapper, valve 6 remains closed and no bleeding of air takes place. The only effect on valve 6 is that during the changes in air flow it will be momentarily seated more tightly on seat 15.

When the flapper is in the position shown at 57, cutting off the flow of air from nozzle 56 and it is caused to move upwardly, the sequence of operations is as follows: As flapper 57 moves upwardly into its several positions, the amount of air blocked by the flapper at the nozzle decreases with each movement. This reduces the back pressure in pipe 55 and bellows 5 and 19. The pressure in chambers 11 and 25 and pipe 45 remain constant and because of the reduction of pressure in the bellows they are both compressed. Such compression of bellows 19 causes pin 21 to be retracted so that valve 30 remains seated. Bellows 5 in its contraction raises valve 6, allowing air in chamber 11 to escape through opening 14, thus reducing pressure in pipe 45 and the diaphragm motor valve, altering the conditions in the system being controlled accordingly. When the escape of air has reduced the pressure in chamber 11 to less than the pressure within bellows 5, the latter will expand and valve 6 will seat and close off opening 14. This prevents any further escape of air. This sequence is repeated with every upward movement of flapper 57 and each movement causes a proportionate amount of air to escape from opening 14 until the fully opened position of flapper 57 is reached.

Numerous advantages are inherent in the structure of the present invention. Because of the arrangement and the differential actions, the device is extremely sensitive and very small changes in the position of the flapper valve cause corresponding changes in the position of the diaphragm motor valve. The latter may be at a very considerable distance from the relay and still the instrument remains highly sensitive since there is no great loss of pressure in the line leading to said diaphragm valve and the device operates on differentials of pressure of small magnitude. The sensitiveness is increased by the fact that even though the pipe line of the diaphragm valve is long, there is always a pressure on air in said line commensurate with the position of the flapper valve so that small changes therein immediately react upon the diaphragm valve. The sensitiveness of the instrument is maintained whether the air pressure on the system is high or low. Thus it operates as effectively at say 8 or 9 lbs. or at 20 to 25 lbs. of air pressure instead of the normal 15 lbs. In the old types of relays of this character, there was a continual loss of air in the line leading to the diaphragm valve, which placed a considerable burden upon the source of supply, such as an air compressor. In the present invention, since air bleeding is only momentary and only at the intervals when changes in the system are taking place, the burden on the compressor has been greatly reduced.

Although the invention has been described setting forth a single specific embodiment thereof, it will be apparent to those skilled in the art that numerous changes in the details of construction and operation thereof may be made within the principles herein set forth. For instance, casing 1 is described as being rectangular but it may be of any desired form. Similarly, the other parts, as caps 18 and 22, which are circular in cross-section, may be made of any desired shape. The introduction of the several sleeves into the casing and caps may be accomplished by a different mechanical arrangement and the adjustments for valves 6 and 30 may be differently constructed. In place of the diaphragm motor valve, any other device which is responsive to pressure changes may be substituted for the same. The several valves in the system may be of different types than those specifically set forth, as for instance, the conical valve 6 may be replaced by a different form of valve, and the ball valve 30 may have substituted for it another type of closure. Also, the flapper valve may be altered in form as is well-known, but its function of controlling the amount of air issuing from the nozzle must be retained. Constriction 52 in duct 51 may be eliminated and the reduction in cross-section obtained by other means, as by an additional member having a sufficiently small passageway to give the constricted effect. The arrangements of the several elements with relation to each other may be greatly altered in that the same functions may be performed by such elements even though their positions are quite different from those shown in the drawing.

These and other variations in the details of the invention may be made within the spirit thereof and therefore the invention is to be broadly construed and not to be limited except by the character of the claims appended hereto.

I claim:

1. A relay comprising a casing having a pair of chambers, a bellows in each chamber, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

2. A relay comprising a casing having a pair of chambers, a bellows in each chamber, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows, and a control valve communicating with said duct for varying the pressure in said bellows and chambers.

3. A relay comprising a casing having a pair of chambers, a bellows in each chamber, a valve adapted to be operated by each of said bellows, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

4. A relay comprising a casing having a pair of chambers, said chambers having a common outlet, a bellows in each chamber, a valve adapted to be operated by each of said bellows, one of said valves adapted to transmit pressure to said outlet and the other valve to remove pressure therefrom, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

5. A relay comprising a casing having a pair of chambers, said chambers having a common outlet, a bellows in each chamber, a valve adapted to be operated by each of said bellows, one of said valves adapted to transmit pressure to said outlet and the other valve to remove pressure therefrom by allowed escape of fluid, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

6. A relay comprising a casing having a pair of chambers, said chambers having a common outlet, a bellows in each chamber, a valve adapted to be operated by each of said bellows, one of said valves adapted to transmit pressure to said outlet through increase of pressure within its bellows causing opening of said first valve and the other valve to remove pressure therefrom, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

7. A relay comprising a casing having a pair of chambers, said chambers having a common outlet, a bellows in each chamber, a valve adapted to be operated by each of said bellows, one of said valves adapted to transmit pressure to said outlet and the other valve to remove pressure therefrom through increase of pressure in the chamber of its bellows causing opening of said second valve, said chambers having a common outlet, a duct communicating with the inside of both of said bellows, a tube communicating with said chambers and adapted to be connected to a fluid pressure supply, a valve in said tube interposed between said chambers and said supply and connected to one of said bellows, an outlet valve in said second chamber and connected to said second bellows, whereby variations in pressure in said duct cause movement of said pair of bellows and operation of said valves, a connection between said supply and said duct and tube to furnish said fluid to said chambers and bellows.

8. A relay comprising a casing having a pair of chambers, a bellows in each chamber, said chambers having a common outlet, a duct communicating with the inside of both of said bellows, a tube communicating with said chambers and adapted to be connected to a fluid pressure supply, a supply valve in said tube interposed between said chambers and said supply, a connection between said supply and said duct and tube to furnish said fluid to said chambers and bellows, the bellows in one chamber connected to said supply valve, a fluid escape valve in the second chamber connected to said second bellows.

9. A relay comprising a casing, a fluid pressure supply pipe for said casing, a pair of adjacent spaced chambers formed therein, a bellows mounted in each chamber at the adjacent ends thereof, a duct in said casing communicating with the inside of both bellows and with said supply, a valve in each of said chambers, each of said bellows connected to a valve, one of said valves being an inlet and the other an outlet valve for the flow of fluid, a tube connecting said supply to said first chamber and valve and an outlet from said second chamber in said casing controlled by said second bellows and valve, whereby variations in pressure in said duct cause movement of said pair of bellows and operation of said valves, and a communication between said chambers and to the outside of said casing.

10. A relay comprising a casing, a fluid pressure supply pipe for said casing, a pair of adjacent spaced chambers formed therein, a bellows mounted in each chamber at the adjacent ends thereof, a duct in said casing communicating with the inside of both bellows and with said supply, a valve in each of said chambers, each of said bellows connected to a valve, one of said valves being an inlet and the other an outlet valve for the flow of fluid, said first valve being closed by spring pressure and opened by expansion of the bellows in said first chamber, a tube connecting said supply to said first chamber and valve and an outlet from said second chamber in said casing controlled by said second bellows and valve, whereby variations in pressure in said duct cause movement of said pair of bellows and operation of said valves, and a communication between said chambers and to the outside of said casing.

11. A relay comprising a casing, a fluid pressure supply pipe for said casing, a pair of adjacent spaced chambers formed therein, a bellows mounted in each chamber at the adjacent ends thereof, a duct in said casing communicating with the inside of both bellows and with said supply, a valve in each of said chambers, each of said bellows connected to a valve, one of said valves being an inlet and the other an outlet valve for the flow of fluid, said first valve being closed by spring pressure and opened by expansion of the bellows in said first chamber, said second valve being normally closed and opened by contraction of the bellows in said second chamber, a tube connecting said supply to said first chamber and valve and an outlet from said second chamber in said casing controlled by said second bellows and valve, whereby variations in pressure in said duct cause movement of said pair of bellows and operation of said valves, and a communication between said chambers and to the outside of said casing.

12. A relay comprising a casing, a fluid pressure supply pipe for said casing, a pair of adjacent spaced chambers formed therein, a bellows mounted in each chamber at the adjacent ends thereof, a duct in said casing communicating with the inside of both bellows and with said supply, a valve in each of said chambers each of said bellows connected to a valve, one of said valves being an inlet and the other an outlet valve for the flow of fluid, a constriction in said duct between said supply and said bellows, a tube connecting said supply to said first chamber and valve and an outlet from said second chamber in said casing controlled by said second bellows and valve, whereby variations in pressure in said duct cause movement of said pair of bellows and operation of said valves, and a communication between said chambers and to the outside of said casing.

OTTO FISCHER.

REFERENCES CITED

The following references are of record in the file of this patent:

UNITED STATES PATENTS

| Number | Name | Date |
|---|---|---|
| 2,202,286 | Gorrie | May 28, 1940 |
| 2,286,282 | Joesting | June 16, 1942 |
| 2,290,987 | Moore | July 28, 1942 |
| 2,299,884 | Edwards | Oct. 27, 1942 |